United States Patent
Sokhey et al.

(10) Patent No.: US 7,980,194 B2
(45) Date of Patent: Jul. 19, 2011

(54) SYSTEM AND METHOD FOR ON-LINE MIXING AND APPLICATION OF SURFACE COATING COMPOSITIONS FOR FOOD PRODUCTS

(75) Inventors: Avtar Sokhey, Englewood, OH (US); Katherine P. Boebel, West Alexandria, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 336 days.

(21) Appl. No.: 12/331,805

(22) Filed: Dec. 10, 2008

(65) Prior Publication Data

US 2009/0086570 A1   Apr. 2, 2009

Related U.S. Application Data

(62) Division of application No. 10/200,556, filed on Jul. 22, 2002, now Pat. No. 7,479,294.

(60) Provisional application No. 60/307,229, filed on Jul. 23, 2001.

(51) Int. Cl.
*A23G 3/20* (2006.01)
*B05C 5/02* (2006.01)

(52) U.S. Cl. .............. 118/13; 118/16; 118/19; 118/303; 118/418; 99/516; 99/534

(58) Field of Classification Search .................... 118/13, 118/16, 19, 303, 418; 99/516, 534
See application file for complete search history.

(56) References Cited

U.S. PATENT DOCUMENTS

| | | | |
|---|---|---|---|
| 4,070,490 A | 1/1978 | Lugay et al. |
| 4,089,978 A | 5/1978 | Lugay et al. |
| 4,215,149 A | 7/1980 | Majlinger |
| 4,371,556 A | 2/1983 | Pitchon et al. |
| 4,410,551 A | 10/1983 | Comer |
| 4,454,804 A | 6/1984 | McCulloch |
| 4,518,696 A | 5/1985 | Gehrman et al. |
| 4,822,626 A | 4/1989 | Spanier et al. |
| 5,011,679 A | 4/1991 | Spanier et al. |
| 5,015,485 A | 5/1991 | Scaglione et al. |
| 5,186,964 A | 2/1993 | Gierhart et al. |
| 5,296,217 A | 3/1994 | Stookey |
| 5,645,878 A | 7/1997 | Breslin et al. |

(Continued)

FOREIGN PATENT DOCUMENTS

CA  1103978 A  6/1981

(Continued)

OTHER PUBLICATIONS

International Vegetarian Union-FAQ. 2004. http:www.ivu.org/faq/gelatine.html updated Oct. 24, 2004, pp. 1-2.

*Primary Examiner* — Laura Edwards
(74) *Attorney, Agent, or Firm* — Cindy L. Clay; Adam W. Borgman; Kim William Zerby

(57) ABSTRACT

A process and apparatus for preparing a surface coating composition for an animal food. The process involves combining, in-line along a food processing line, liquid fat and a dry additive to provide a liquid fat-dry additive composition, which then is combined with a liquid additive to provide a surface coating composition. The composition is coated on the food.

4 Claims, 2 Drawing Sheets

U.S. PATENT DOCUMENTS

| | | |
|---|---|---|
| 5,698,246 A | 12/1997 | Villamar |
| 5,968,569 A | 10/1999 | Cavadini et al. |
| 6,056,822 A | 5/2000 | Jefferson et al. |
| 6,479,051 B1 | 11/2002 | Bruce et al. |
| 2004/0071828 A1* | 4/2004 | Troy et al. .................. 426/72 |

FOREIGN PATENT DOCUMENTS

| | | |
|---|---|---|
| EP | 0682874 A2 | 11/1995 |
| GB | 1572761 | 8/1980 |
| WO | WO 97/42838 | 11/1997 |
| WO | WO 03/009710 A1 | 2/2003 |

\* cited by examiner

SYSTEM AND METHOD FOR ON-LINE MIXING AND APPLICATION OF SURFACE COATING COMPOSITIONS FOR FOOD PRODUCTS

CROSS REFERENCE TO RELATED APPLICATION

This application is a divisional of U.S. application Ser. No. 10/200,556, filed Jul. 22, 2002, now U.S. Pat. No. 7,479,294, which claims the benefit of priority to U.S. Provisional Patent Application Ser. No. 60/307,229, filed Jul. 23, 2001, which is hereby incorporated by reference.

FIELD OF THE INVENTION

The invention provides a process for preparing and applying a surface coating composition for food such as animal food having dry and liquid additives.

BACKGROUND OF THE INVENTION

In the pet food industry, palatability enhancing materials, often referred to as "palatants," may be provided to certain foods categorized generally as "kibble," to increase enjoyment of the food while providing for the nutritional needs of the animal. As used in this industry, "palatability" generally encompasses within its meaning all of the various properties of the food that can be sensed by an animal, including taste and smell. Materials such as animal origin digests, organic acids and their salts, and different types of meat proteins are commonly used to enhance the palatability of the pet foods. These may be either liquid or dry, depending on the desired properties. It is also desirable to increase other properties of the animal food while maintaining its palatability. Therefore, functional additives, such as probiotic microorganisms, vitamins, certain pharmaceutical compounds, and tartar control agents, may be provided in animal food to increase the overall benefit to the animal. Palatants and other functional additives can either be incorporated into the food or can be topically applied onto the surface of the food. Surface application is commonly done following extrusion of the food product. Surface application is generally preferred as a method of providing these additives, because either the flavor of the additive, such as a palatant, can be masked by other ingredients within the kibble, or the additives may lose their desired properties through process-sensitive decomposition if they are incorporated into (i.e., intermixed with) the food composition itself. Further more, it is known that some additives, such as tartar control agents, may be made more immediately available at a higher concentration in the oral cavity if provided on the surface of the animal food. It is therefore often preferred in the art to surface coat the animal food with the palatants and other beneficial additives.

In general, application of materials to the surface of the food is usually performed using a staged application or other types of processes. With respect to the staged surface coating process, it is common in the art to apply liquid fat to the surface of the animal food, followed by the application of dry and liquid additives. In the staged application process, the liquid fat is generally used as a binder to secure the dry and liquid additives to the surface of the animal food. To utilize the fat as a binder in staged application, however, dry and liquid additives generally must be applied in excess to ensure that the animal food is sufficiently coated with the additives, and a significant amount of the excess additives may be wasted, thereby contributing to increased costs of production, raw material, storage, and clean-up. Furthermore, it may be difficult to optimize or change the amounts of dry and liquid additives applied to the surface of the animal food when changing from one product to another without having to first shut down the entire staged application process. When changing the mixes for different product runs, entire batches of liquid-dry mixes must be removed and exchanged.

To overcome some of the problems associated with the staged application process, a simultaneous application process is often employed as alternative. In the simultaneous application process, liquid fat is used as a carrier and binder substrate for the dry and liquid additives. Specifically, liquid fat, dry additives, and liquid additives are mixed simultaneously to form a surface coating composition. Other approaches result in highly viscous compositions, which can be more difficult to provide the ingredients to the surface of the food in a uniform manner. Furthermore, many of the dry materials contained in the surface coating composition, such as, for example, vitamins, antioxidants, probiotic microorganisms, pharmaceuticals, enzymes, peptides, proteins, herbals, flavors, and the like, may more likely be degraded during mixing when all additives are combined well before application, thereby increasing the exposure of certain ingredients to process and environmental conditions such as moisture, acidic components within a prepared digest, heat, shear or pressure, or a combination of two or more of these or other deleterious factors. Specifically, the liquid additives, which are likely aqueous and highly acidic, may subject dry additives to hygroscopic effects such pH change or water activity due to exposure to water during mixing, causing a loss of desired efficacy of the dry additives.

Therefore, there exists a need in the art for a process of surface coating animal food with dry and liquid additives that overcomes the aforementioned problems.

SUMMARY OF THE INVENTION

A system and method are provided for preparing a surface coating composition for a food product, particularly an animal food product. Specifically, the method provides a modular, on-line mixing system that allows ingredients to be mixed as needed, thereby reducing waste and viscosity build within the system. The process includes providing one or more liquid fats, one or more dry additives, and one or more liquid additives for application in an on-line application process which results in less decomposition or loss of desired ingredients and a decreased occurrence of formation of viscous solution which may impair the application process and decrease uniformity of application.

In the on-line application process, use of metered mixing of components as needed minimizes reaction time for viscosity build, providing better uniformity of application. In one embodiment, a liquid fat and a dry additive are combined to provide a liquid fat-dry additive composition. The liquid fat-dry additive composition can then be combined with the liquid additive (to which a soluble liquid or dry additive may or may not have been added) to provide a surface coating composition for application to a food product following extrusion and drying. "Dry additive" is meant to include at least one dry additive. Similarly, "a liquid additive" is meant to include at least one liquid additive.

In another embodiment, the method includes mixing of less stable ingredients into the appropriate carrier, such as fat or oil, to provide protection from additional ingredients which must be added to the surface of the food. Mixing is done essentially at the point of delivery, minimizing exposure to deleterious environmental elements. On-line delivery and mixing of ingredients allows combinations of suitable carriers with specific ingredients without necessitating shut-down of the processing operation to provide for mixing as new ingredients are needed.

Further, a method is provided for protecting the stability of a dry additive from, for example, moisture, hygroscopicity, and pH change when exposed to a liquid digest formed of components of animal origin, or other artificially or naturally occurring environmental influences. Specifically, the method includes encapsulating a dry additive in a liquid fat to provide fat-encapsulated dry additive. Such method provides for the stability of the dry additives which are protected from moisture, hygroscopicity, and pH change by the fat when exposed to the liquid animal digest.

The inventive process overcomes the shortcomings associated with staged application of dry and liquid additives onto the surface of animal food. The process allows for optimizing the amount of dry additives on the surface of the animal food while minimizing waste. Also, the process of surrounding or encapsulating dry additives in liquid fat prior to the addition of liquid additives protects unstable and sensitive additives during the production of a surface coating composition, while minimizing the time for viscosity to build before application. Furthermore, the on-line mixing and application provided by the present invention gives a significant benefit by providing for more uniform application of surface coating compositions and essentially eliminating costly delays and repairs caused by formation of viscosity in mixed compositions as traditionally used in either simultaneous or staged application processes.

DETAILED DESCRIPTION OF THE INVENTION

Figure 1:
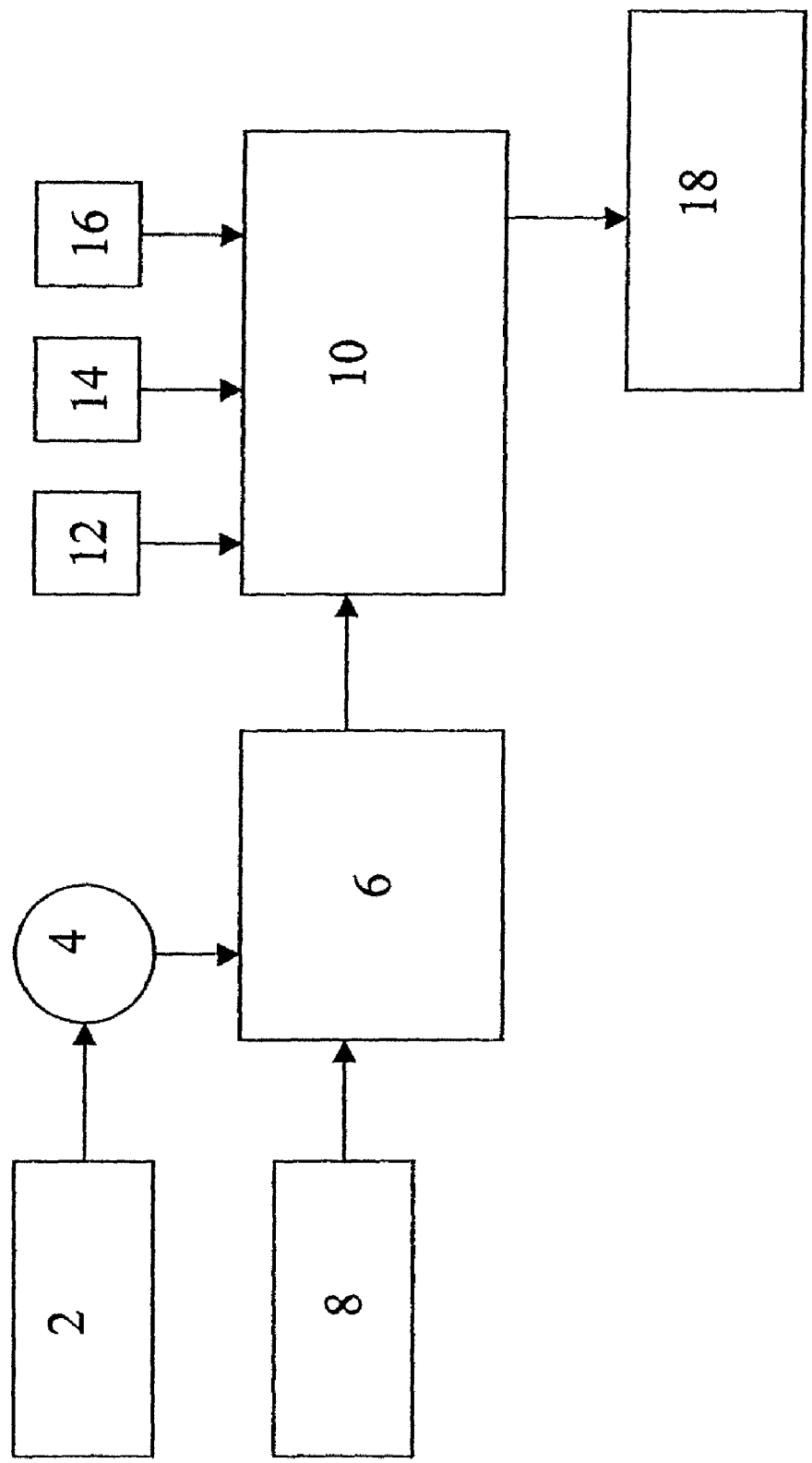
FIG. 1 is a schematic representation of the overall system and method.

A system and method for on-line mixing and application of a surface coating for foods using a combination of ingredients are provided herein. The inventors have developed a novel system and method for on-line application of combinations of dry additives, liquid (aqueous) additives, and fat additives which allows additives to be mixed as needed, minimizing reaction time between ingredients within the system for viscosity build and providing a more uniform application. Mixing is done as ingredients are needed for delivery into the system for application, and application is performed after extrusion and drying. The on-line mixing system allows ingredients which are more sensitive to physical and chemical elements within the system to be protected by mixing them into an appropriate carrier to provide a protective coating (such as coating in fat or oil, for example), and decreasing decomposition due to shear, pressure, heat, or other factors by mixing and applying post-extrusion and post-drying. In one embodiment, a process is provided for surface coating animal food with a dry additive that is either sensitive to or unstable in the presence of a liquid additive. The process includes mixing liquid fat and the dry additive in a dry mix module to form a liquid fat-dry additive composition. The liquid fat-dry additive composition is then mixed with the liquid additive, e.g., liquid digest, in a liquid mix module to form the surface coating composition. The surface of the animal food is then coated with the surface coating composition from the liquid mix module, thereby providing a coated animal food.

Unstable or sensitive, as used herein, refers to the loss or potential loss of efficacy of an additive, i.e., loss of palatability or nutritive value, caused by the presence of another additive, process conditions or environmental conditions, regardless of whether the loss of efficacy is due to a chemical, physical or biological change.

The food product can be any suitable composition that is ingestible by a human or an animal and that provides nutritional value to the human or animal. The food can be coated or uncoated prior to being treated in accordance with the invention. An animal food generally will be a basal food composition having a nutritionally balanced mixture of proteinaceous and farinaceous ingredients, which have a moisture level of less than about 50% by weight. The food product can be baked, extruded, pelleted, or formed. Such forms of food products, and methods for their production, are well known to those of skill in the art of food manufacturing. Extrusion and extrusion cooking, for example, are described on pages 794-800 of the *Encyclopedia of Food Science and Technology*, Volume 2 (Y. H. Hui, ed., John Wiley & Sons, Inc. 1992).

The embodiment provides a method for mixing and applying a coating composition for a variety of types of foods. The method can be used, for example, to provide a vitamin coating for breakfast cereal, a coating of tartar control agents on cereal treats and coated snack foods, or a coating of vitamins, flavorings, or other additives for potato chips or cheese curls.

Generally, aside from the nutritional balancing additives included in these products, such as the vitamins and minerals, or the other additives, such as preservatives and emulsifiers and the like, the animal food for the most part will consist of ingredients which may be described as substantially proteinaceous or substantially farinaceous. Although the following should not be considered limiting, a proteinaceous ingredient can generally be defined as any material having a protein content of at least about 15% by weight, whereas a farinaceous material has a protein content substantially below this and has a major fraction of starchy or carbohydrate containing materials.

Examples of proteinaceous materials, which are typically used in commercial animal foods, are vegetable protein meals, such as soybean, cottonseed, peanut, animal proteins such as casein, albumin, and meat tissue including fresh meat a well as rendered or dried "meals" such as fish meal, poultry meal, meat meal, meat and bone meal, enzymatically-treated protein hydrolysates, and the like. Other types of proteinaceous materials include microbial protein such as yeast, and other types of protein, including materials such as wheat gluten or corn gluten.

Examples of typical farinaceous materials include enzymatic farinaceous materials, grains such as corn, maize, alfalfa, wheat, soy, sorghum, barley, and various other grains which are relatively low in protein. Numerous other materials could be added to the animal food, especially cat food, which do not necessarily fall into either category, such as dried whey, and other dairy by-products or carbohydrates.

The animal food is not limited to a particular composition. In general, however, the term "animal food" is intended to apply to nutritionally balanced animal food products, such as, for example, commercially available dog and cat food and treats. The animal food meeting this definition can be characterized as having minimum nutrient levels known to those of skill in the art. Preferred animal foods are those that are nutritionally balanced. The animal food can be any suitable form and is typically in bite-size or pellet form of any shape.

The term "fat" refers to any edible grade fat or lipid, including fats of avian, animal, plant, or manufactured origin, including, but not limited to, crude or refined fats. Typical animal origin fats include, for example, animal tallow, choice white grease, lard, milk-derived fats such as butter oil, and fat typically contained in cheese. Typical fats of vegetable origin include coconut oil, soybean oil, and corn oil. Typical fats of avian origin include fats derived from the tissue of chickens, turkeys, ducks, and geese, for example.

The term "liquid fat" refers to fat that is substantially flowable, i.e., liquid. The fat can be liquid at room temperature or rendered substantially flowable by heating the fat until the desired flowability is achieved. Preferably, the fat is substantially flowable at temperature between about 10° C. to about 90° C.

The term "dry additive" refers to an additive that is solid at about 25° C. and has a moisture content below about 35 wt %. Typical dry additives include, for example, meat solids, dry animal digest, dry palatants, antibiotics, protiotics, protiotic microorganisms, vitamins, minerals, and tartar control agents.

Meat solids refers to meat and meat by-product. Meat is the tissue of an animal, such as the flesh of cattle, swine, sheep, goats, and other mammals. The meat preferably is beef, veal, or pork. Other sources of solids and by-products include tissue derived from chicken, turkey, duck, goose, or fish. "By-product" is the non-rendered part of a carcass of a slaughtered animal, including a mammal, bird, or fish. The terms "meat" and "meat by-product" are used herein in the same manner as described in the Definitions of Feed Ingredients published by the Association of American Feed Control Officials, Inc. (AAFCO).

Dry animal digest refers to a dry digest of meat solids (either meat or meat by-product). Typically, a dry animal digest is prepared by subjecting a meat by-product to proteolytic or lipolytic enzyme digestion, as is well known in the art, with reaction conditions preferably controlled to obtain maximum flavor development. The product is typically then reduced to a substantially dry form, i.e., having low moisture content, to form the dry digest.

Dry palatants refer to any dry additives that increase the palatability of food to an animal. As such, palatants typically include meat and cheese flavorings and, therefore, can include meat solids and dry animal digest, but also include other components that can be present as dry additives, such as herbs, flavors, and the like. Examples of dry palatants include Brewer's yeast, which comprises dried pulverized cells of a yeast of the genus *Saccharomyces* (usually *S. cerevisiae*), often used in brewing, *Torula* yeast, and various yeast extracts. It is known to those of skill in the art that a variety of yeasts can be used as palatants.

The dry additives can include any suitable antibiotics, prebiotics, probiotics, 5 and vitamins. Suitable probiotic microorganisms can include yeast such as *Saccharomyces, Debaromyces, Candida, Pichisa* and *Torulopsis*, molds such as *Aspergillus, Rhizopus, Mucor*, and *Penicillium* and bacteria such as the genera *Bifidobacterium, Bacteroides, Clostribium, Fusobacterium, Melissococcus, Propionibacterium, Streptococcus, Enterococcus, Lactococcus, Staphylococcus, Peptrostrepococcus, Bacillus, Pedicoccus, Micrococcus, Leuconostoc, Weissella, Aerococcus, Oenococcus* and *Lactobacillus*. Specific examples of suitable probiotic microorganisms are: *Saccharomyces cerevisiae, Bacillus coagulans, Bacillus licheniformis, Bacillus subtilis, Bifidobacterium bifidum, Bifidobacterium infantis, Bifidobacterium longum, Enterococcus faecium, Enterococcus faecalis, Lactobacillus acidophilus, Lactobacillus alimentarius, Lactobacillus casei* subsp. *Casei, Lactobacillus casei Shirota, Lactobacillus curvatus, Lactobacillus delbruckii* subsp. *Lactis, Lactobacillus fareciminus, Lactobacillus gasseri, Lactobacillus helveticus, Lactobacillus johnsonii, Lactobacillus reuteri, Lactobacillus rhamnosus (Lactobacillus GG), Lactobacillus sake, Lactococcus lactis, Micrococcus varians, Pediococcus acidilactici, Pediococcus pentosaceus, Pediococcus acidilactici, Pediococcus halophilus, Strepococcus faecalis, Streptococcus thermophilus, Staphylococcus carnosus*, and *Staphylococcus xylosus*. The probiotic microorganisms preferably are in powdered, dried form. Those microorganisms are encapsulated, for example, in liquid fat, using the method of the present invention, to increase the likelihood of their survival on the animal food until digestion by an animal.

Other dry additives can include, for example, antioxidants, carotenoids, lutein, bioflavonoids, vitamins, minerals, natural or organic fermentation products or extracts, enzymes, microbial growth inhibitors, and compounds which can provide a benefit by decreasing oral malodor.

Dental active agents are any agents that act to inhibit or prevent dental calculus (tartar) and plaque build-up on the teeth of animals. Suitable tartar control agents include, but are not limited to, crystal growth inhibitors, such as soluble pyrophosphates, sodium tripolyphosphate, sodaphos, sodium acid metaphosphate, soluble diphosphonates, and certain soluble zinc compounds, such as zinc chloride, and sequestrants, such as sodium hexametaphosphate, hydroxycarboxylic acids, including citric acid, fumaric acid, glutaric acid, acetic acid, oxalic acid, and the like, and their alkali salts, such as sodium citrate, potassium citrate, etc., as well as their aminopolycarboxylic acid derivatives, such as, for example, ethylenediaminetetraacetic acid. Other suitable tartar control agents may include microbial growth inhibitors and enzymes, particularly enzymes that can act by inhibiting deposition of calculus or by breaking down formations of calculus within the oral cavity. Cyclodextrins or other odor control or odor modoulating compositions can also be used in coating compositions for application in the method of the present invention.

The dry additives can include other components, such as food grade pigments, viscosity modifiers, pH adjusters, and the like, to desirably affect the surface coating composition and/or the animal food to which it is applied.

The term "liquid additive" refers to an additive that is substantially liquid at 25° C. or a substance that has a moisture content above about 35 wt. %. Suitable liquid additives include, for example, water, non-aqueous liquids, aqueous and non-aqueous liquid systems (including liquid emulsions), fat-miscible and immiscible liquids, and suspensions or dispersions of solids in liquids. Typical liquid additives include liquid animal digest, oil, water, vitamins, amino acids, proteins, nutrients, oils, flavors, acidulents, food grade dye compositions, and colorants (such as caramel, which also provides flavor). Liquid animal digest is similar to its dry counterpart, discussed above, except that it is fluid or can be made flowable when applied.

The surface coating composition comprises liquid fat, dry additives, and liquid additives, or any combination thereof, in any suitable amounts. The surface coating composition typically comprises about 1 to about 9.95 wt. % (optionally, about 35 to about 99.95 wt. %) liquid fat, about 0 to about 60 wt. % (optionally, about 1 to about 50 wt. %) dry additives, and 0 to about 99.95 wt. % (optionally, about 0 to about 80 wt %) liquid additives.

Surface coating, as used herein, refers to the topical deposition of the surface coating composition onto the animal food, such as by spraying, dipping, emulsifying, and the like. In one option, the surface coating composition is coated onto the animal food uniformly or that uniform distribution of the surface coating composition is achieved. One method is repeated tumbling of the animal food in the presence of the coating composition. One or more coats of the coating composition may be applied to the animal food in accordance with the inventive method.

While the various palatability enhancers and nutritional additives provide a balanced diet for the consuming animal, they may also provide significant processing problems when such additives are sensitive to processing and environmental conditions, and many of the dry additives, e.g., probiotic micro-organisms and tartar control agents, are unstable in the presence of aqueous and highly acidic environments. In particular, the dry additives of the preferred surface coating composition are highly sensitive to moisture, hygroscopicity, pH change, and other processing and environmental considerations such as heat and mechanical shear. The liquid digest alone creates many of these undesirable conditions, i.e., moisture, pH, etc., to the extent that the dry additives lose much their desired efficacy upon exposure to the liquid digest.

The inventive process overcomes the shortcomings associated with staged and simultaneous application of dry and liquid additives onto the surface of animal food. For instance, by surrounding or encapsulating dry additives in liquid fat prior to the addition of liquid additives, the inventive process protects unstable and sensitive materials during the production of a surface coating composition. For example, probiotic micro-organisms ("probiotics") may be added to the surface of animal foods as a nutritive supplement. Probiotics are in a dormant state when dry. Encapsulating the probiotic micro-organisms in the liquid fat protects them from moisture and nutrients, e.g., liquid digest.

It has been discovered that suspending probiotics in liquid digest activates the micro-organisms such that they are no longer dormant. When the probiotic micro-organisms are no longer dormant, they can grow prematurely in the liquid digest and not in the intestines of the animal. The premature growth of the micro-organisms contributes to a loss in efficacy. In fact, most of the probiotic micro-organisms are destroyed before they ever reach the intestines of the animal unless they are first encapsulated in fat.

Probiotics are not the only unstable or sensitive dry additives. Other dry additives are unstable under or sensitive to processing and environmental conditions, including exposure to the liquid digest. For example, many of the components of the surface coating composition are sensitive to moisture, heat, mechanical shear, pH, etc. Some examples of materials preferably coated onto the surface of the animal food that are sensitive to or unstable under processing and environmental conditions include vitamins, antioxidants, pharmaceuticals, enzymes, proteins, phosphates, herbals, and flavors, to name a few.

It has also been discovered that the high acid coating contributes significantly to the loss of efficacy of the dry additives that are sensitive to acidic conditions or pH change. For example, it has been discovered that phosphates, probiotics, enzymes, dry palatants, etc. lose much of their desired properties unless they are first encapsulated with fat. The fat encapsulation protects the dry additives from the high acid liquid composition of the liquid digest and the surface coating composition ultimately applied to the surface of the animal food. Accordingly, it has been discovered that encapsulating the dry additives with fat prior to the addition of destructive liquid additives, namely liquid digest, substantially protects the palatability and/or nutritional value of the dry additives during the process of manufacturing animal food surface coated with dry and liquid additives.

The animal food may be produced in many different ways as desired. Pet foods, for example, are often produced by extrusion cooking. The dried food pieces are introduced into a surface coating apparatus. The surface coating composition may be applied to the surface of the dried food pieces by any appropriate method, such as spraying, mixing, or dipping the food pieces with the surface coating composition to provide the desired level of fat, dry additives, and liquid additives on the dried food pieces. Preferably, the surface coating composition is introduced to an enrober with the dried food pieces. Although the type of equipment used to facilitate the surface coating of the dried food pieces is not limiting to the inventive process, suitable enrobing devices include disk enrobing machines manufactured by Wenger (Sabetha, Kans.). The enrobing procedure may be repeated to add multiple layers of the surface coating composition if desired.

Following the surface coating of the dried food pieces, the coated pieces are collected and then transported, if desired, to a tumbling drum or similar apparatus where the coated food pieces are tumbled repeatedly to improve the uniformity of the coating. The surface coated animal food may be re-introduced to the enrober for additional applications of the surface coating composition. Once the tumbling process is completed, the surface coated food pieces can be removed from the tumbling drum and cooled to room temperature. The surface coated animal food is then ready for packaging and delivery.

A process is provided for surface coating animal food with dry and liquid additives resulting in a food product for animals having the desired nutritional value and palatability. As is shown generally in FIG. 1, the process comprises mixing of additives from a dry material handling system (2) which is provided as needed by use of a dry materials metering system (4) to a dry-liquid mix module (6), where the dry material is combined with liquid fat container (8). Once the dry material has been sufficiently mixed and coated with liquid fat, the entire mixture is transported to a liquid material has been sufficiently mixed and coated with liquid fat, the entire mixture is transported to a liquid-liquid mixing system (10), where one or more liquid additives (12, 14, 16) are provided for admixing with the dry-liquid fat mixture.

Figure 2:
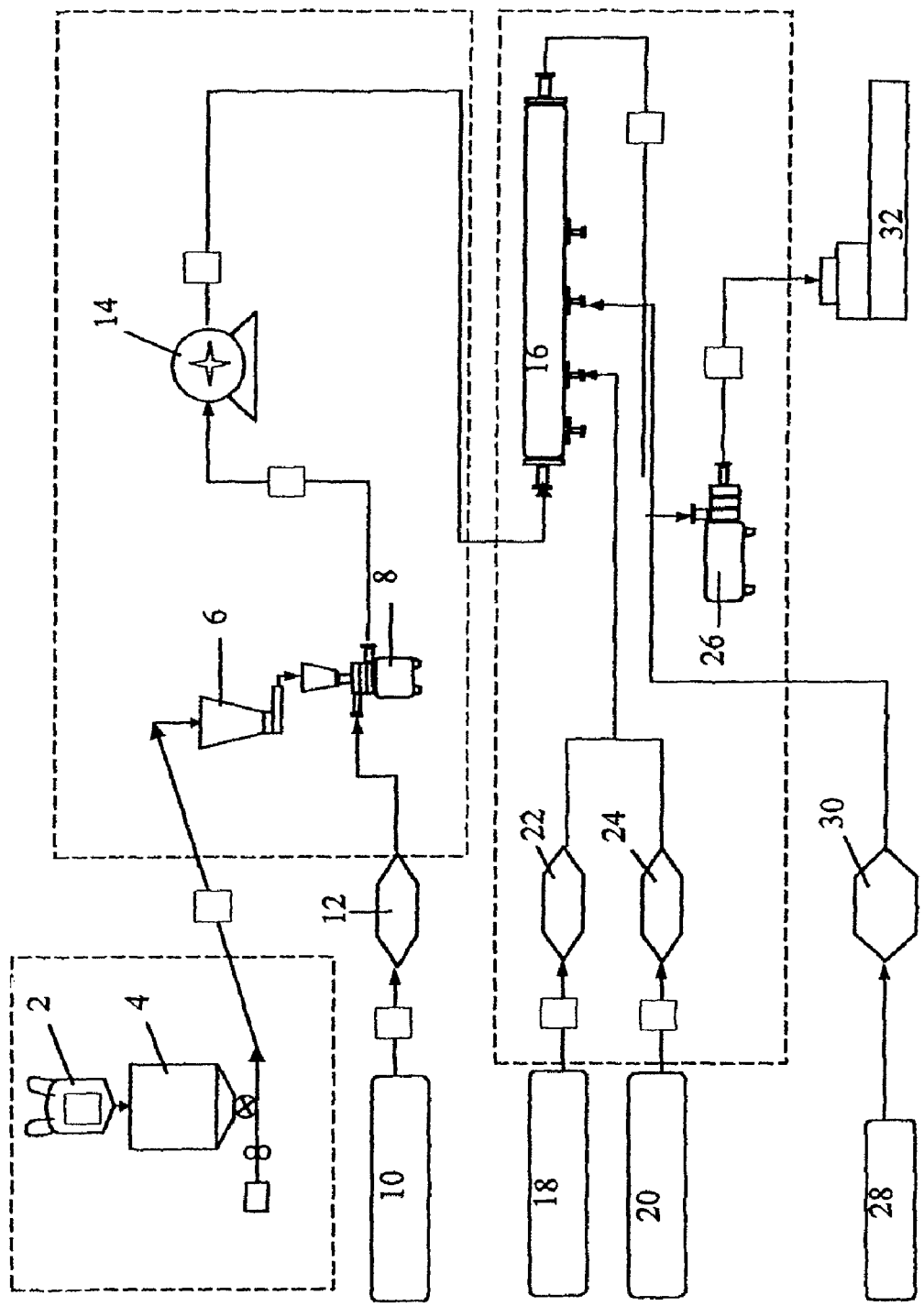
FIG. 2 is a schematic representation of one embodiment of the system and method.

One embodiment for use in coating pet food kibble is shown generally in FIG. 2. As is shown in the schematic diagram of FIG. 2, a bulk bag (2) provides solids in-line to the food processing line. Solids from the bulk bag are fed into a surge bin (4) for handling the dry material and introducing it into the mixing system. The surge bin preferably is fitted with high bin and low bin indicators to meter the flow of dry material into the system. From the surge bin (4), dry material is transported to a loss-in-weight, or weight-loss-differential, feeder (Acrison, Inc., Moonachie, N.J.), which meters the desired quantities of dry material in-line into a medium/high shear mixer (IKA Works, Inc., Wilmington, N.C., Model MHD5 or MDH10) along a food processing line. Other suitable dry-liquid mixing modules include, for example, those manufactured by Bematek Systems, Inc. (Beverly, Mass.) and Ross (Hauppauge, N.Y.).

Once in the medium/high shear mixer, the dry additives are combined with liquid fat from a liquid fat bin (10) or liquid fat source, which is supplied to the mixer through a metering system (12) in-line along the food processing line. The admixed dry material and liquid fat are then transported through a positive displacement pump (a variable speed centrifugal pump controlled by inlet pressure), which pumps the mixture to the mixing manifold (16) that is communicatively coupled with the food processing line. The dry-liquid fat mixture is further combined with one or more liquids, such as liquid digest (18), a second major liquid additive (20), and/or a minor liquid additive (28), each of which is transported to the mixing manifold (16) through a metering system (22,24, 30, respectively) for metering the appropriate amount of liquid additive in-line into the food processing line. Once the dry-liquid fat mixture is combined with the one or more liquids, the mixture is transported in-line along the food processing line to a high shear mixer (Silverson Machines, Inc., East Longmeadow, Mass., Model L150 or L200), or a liquid-liquid mixer, communicatively coupled therewith. The dry-liquid fat mixture can be thoroughly admixed with the one or more liquid additives for application to the food product in the disk enrober (32) (Wenger, Sabetha, Kans.). In one option, the mixing manifold and high shear mixer are positioned near the enrober, to decrease the potential for viscosity build in the system prior to application. The enrober, to decrease the potential for viscosity build in the system prior to application. The enrober, in one option, is positioned at a second end of a food processing line, and the liquid-liquid mixer is positioned in close proximity to the enrober.

The dry additives, such as, for example, dry digest, dry meat, probiotics, tartar control additives, yeast, vitamins, pharmaceuticals, and the like, at ambient temperatures are mixed with the liquid fat. The residence time of the dry additives mixed with the liquid fat is dependent upon the formulation of the surface coating composition, as well as process considerations, such as the choice of equipment. Many of the dry additives are unstable in the presence of the liquid additives, e.g., liquid digest. The residence time of the dry additives mixing with the liquid fat is sufficient to ensure that the dry additives are suspended thoroughly in the liquid fat in order to protect them from the liquid additives mixed with the liquid fat-dry additive composition in the liquid mix module. For example, the dry additives and liquid fat are mixed for about 5 minutes to about 60 minutes, and optionally for about 10 minutes to about 30 minutes, e.g., 15-25 minutes, at a temperature sufficient to maintain the flowability of the liquid fat.

Minor liquid additives may also be mixed with the dry additives and liquid fat in the dry-liquid mix module, so long as the liquid additives do not detrimentally impact the desired efficacy of the dry additives. Conversely, dry additives may also be added in either dry form, or in the form of a minor liquid mixture, to the liquid-liquid mix module, provided that those dry additives are suitably soluble in the major or minor liquid additive. Typical minor liquid additives include, for example, vitamins, antioxidants, oils, dyes, colorants, and the like. In one option, aqueous or fat immiscible liquid additives are added in the liquid mix module due to the rise in viscosity associated with mixing fat and fat immiscible or aqueous liquids together.

The resulting liquid fat-dry additive composition containing the liquid fat and dry additives (and optionally minor liquid additives) is introduced into the liquid mix module where the dry additives are kept in suspension in the liquid fat. The liquid mix module preferably consists of mixing manifold, inlets for all fluids (liquid fat-dry additive composition, liquid digest, and all other liquids) entering into the manifold, a liquid-liquid mixing device, preferably a closed and pressurized blender system, and one outlet for the overall surface coating composition. Mixing manifolds and blenders are well known in the art and the inventive process is not dependent upon the choice of equipment used to carry out the process. Suitable mixing manifolds include, for example, those manufactured by Silverson Machines, Inc. (East Longmeadow, Mass.), i.e., Silverson Model L150 or L200.

In the liquid mix module, liquid additives such as, for example, liquid digest, oil, enzymes, acidulents, and the like, are mixed with the liquid fat-dry additive composition of the dry-mix module in the liquid mix manifold. At this stage, the dry additives should be sufficiently encapsulated or surrounded by the liquid fat so as to protect the stability and sensitivity of the dry additives in the presence of the damaging liquids. The temperature of the liquid mix manifold is sufficient to maintain the flowability of the fat carrier and is preferably the same temperature as maintained in the dry-liquid mixer. The residence time of the liquid fat-dry additive composition and the liquid additives together in the mixing manifold should be sufficient to introduce the liquid additives to the liquid fat-dry additive composition.

The liquid exiting the liquid mix manifold containing liquid fat, dry additives, and liquid additives is introduced into a mixer to mix the liquid fat-dry additive composition and liquid additives together, for example, just prior to the enrobing or coating process. The liquid fat-dry additive composition and liquid additives may be mixed by any conventional means for mixing, blending, or stirring compositions containing suspended solids. However, blending in a high shear mixer is preferred because the resulting viscosity of the surface coating composition is highly viscous.

When aqueous or fat immiscible liquid additives, e.g., liquid digest, are mixed with the liquid fat-dry additive composition, the viscosity of the resulting mixture increases substantially. However, it is not desirable to reduce the viscosity by heating the mixture substantially beyond the melting temperature of the fat because of high processing costs and safety concerns. In addition, heating the surface coating composition at elevated temperatures will adversely impact both the flavor and nutritional value of the dry and liquid additives. For example, vitamins are known to substantially degrade upon exposure to heat. Probiotic micro-organisms are also sensitive to heat. The residence time of the composition in the blending device is sufficient to blend the composition before the viscosity substantially increases. In one option, the residence time of the composition in the blending device is from about 1 to about 30 minutes, in another option, about 5 to about 15 minutes, and in yet another option, about 8 to about 12 minutes. E.g., 10 minutes.

Practitioners of the method will find it advantageous to position the liquid mix module close to the enrobing device for surface coating the dried animal food. Furthermore, the modules are positioned along the same processing line, as opposed to producing the material in "batches." The close proximity of the liquid mix module and the enrobing device reduces the residence time of the surface coating composition in the pipes and pumps communicatively connecting the liquid mix module to the enrobing device, thereby avoiding the risk that the surface coating composition will turn substantially viscous thereby rendering the pumps useless.

EXAMPLES

*Lactobacillus* and *Bifidobacteria* were provided to the surface of pet food kibble at a concentration of $10^6$ viable organisms per milliliter of coating composition. Briefly, microbes were provided as freeze-dried cultures to provide the dry material for mixing with liquid fat in the dry-liquid fat mixing module. Following the in-line mixing in the IKA medium/high shear mixer, the dry-liquid fat mixture was transported in-line to the mixing manifold, where it was combined with liquid digest Applied Food Biotechnology, Inc. (Fenton, Mo.). The dry-liquid fat-liquid digest combination was then transported in-line to a high-shear Silverson mixer (Silverson Machines, Inc., East Longmeadow, Mass.) for thorough admixing prior to application to the surface of the kibble. The Silverson mixer is positioned in close proximity to the enrober.

The method has also provided the tartar control agent sodium hexametaphosphate, which is known to exhibit significant viscosity when combined with liquid, to the surface of the kibble with even application at a concentration of approximately 0.4% by weight. Sodium hexametaphosphate was provided as the dry ingredient to be admixed with liquid fat. Upon admixing the sodium hexametaphosphate in the IKA mixer, the mixture was transported to the mixing manifold to be combined with liquid digest supplied by Applied Food Biotechnology. This combination was then transported to the Silverson high-shear liquid mixer, where it was thoroughly admixed prior to surface application to the kibble.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus comprising: a food processing line having at least one dry additive source comprising at least one of an antibiotic, a prebiotic, a Probiotic, a vitamin, an antioxidant, a carotenoid, and an enzyme, and at least one liquid fat source coupled with a first metering system for supplying a predetermined amount of liquid fat in the food processing line; the dry additive source and the liquid fat source communicatively coupled with a dry-liquid mixing device coupled with the food processing line; a coating apparatus and a liquid-liquid mixing device communicatively coupled with the food processing line at a point of delivery to the coating apparatus; and a liquid additive source comprising at least one of a vitamin, an antioxidant, an oil, a dye, and a colorant, communicatively coupled with the liquid-liquid by a second metering system for supplying a predetermined amount of liquid additive in the food processing line.

2. The apparatus as recited in claim 1, wherein the liquid-liquid mixing device is disposed in close proximity to the coating apparatus.

3. The apparatus as recited in claim 1, wherein the coating apparatus comprises an enrober, wherein the food processing line has a first end and a second end, the enrober is disposed at the second end, and the liquid-liquid mixing device is disposed adjacent to the enrober.

4. The apparatus as recited in claim 1, further comprising a pump coupled with the food processing line between the dry-liquid mixing device and the liquid-liquid mixing device.

* * * * *